United States Patent
Ansley

(10) Patent No.: US 8,121,112 B2
(45) Date of Patent: *Feb. 21, 2012

(54) METHOD AND SYSTEM FOR PROCESSING VOICE TRAFFIC FROM A MULTI-CHANNEL LINK INTO A VOIP NETWORK OVER A BROADBAND NETWORK

(75) Inventor: Carol Ansley, Alpharetta, GA (US)

(73) Assignee: ARRIS Group, Inc., Suwanee, GA (US)

( * ) Notice: Subject to any disclaimer, the term of this patent is extended or adjusted under 35 U.S.C. 154(b) by 1371 days.

This patent is subject to a terminal disclaimer.

(21) Appl. No.: 10/929,966

(22) Filed: Aug. 30, 2004

(65) Prior Publication Data

US 2005/0047400 A1    Mar. 3, 2005

Related U.S. Application Data

(60) Provisional application No. 60/498,787, filed on Aug. 29, 2003.

(51) Int. Cl.
*H04L 12/66* (2006.01)
*H04J 3/04* (2006.01)

(52) U.S. Cl. ........ 370/352; 370/252; 370/356; 370/360; 370/460; 375/259; 379/68; 379/88.17; 455/7; 455/182.2; 709/224; 709/236; 709/239; 709/249; 710/8

(58) Field of Classification Search .......... 370/352–357, 370/360, 468, 252, 460, 535; 375/259; 379/88.17, 379/68; 455/182.2, 7; 709/224, 236, 239, 709/249; 710/8

See application file for complete search history.

(56) References Cited

U.S. PATENT DOCUMENTS

| | | | | |
|---|---|---|---|---|
| 6,137,793 | A * | 10/2000 | Gorman et al. | 370/360 |
| 6,282,192 | B1 * | 8/2001 | Murphy et al. | 370/352 |
| 6,839,356 | B2 * | 1/2005 | Barany et al. | 370/401 |
| 6,947,528 | B1 * | 9/2005 | Ko et al. | 379/88.17 |
| 6,957,042 | B2 * | 10/2005 | Williams | 455/7 |
| 7,218,901 | B1 * | 5/2007 | Mobley et al. | 455/182.2 |
| 7,283,517 | B2 * | 10/2007 | Yan et al. | 370/352 |
| 7,336,680 | B2 * | 2/2008 | Sorenson et al. | 370/468 |
| 7,376,191 | B2 * | 5/2008 | Melick et al. | 375/259 |
| 7,391,760 | B1 * | 6/2008 | Caldwell et al. | 370/352 |
| 2002/0006137 | A1 * | 1/2002 | Rabenko et al. | 370/466 |
| 2002/0051463 | A1 * | 5/2002 | Higuchi | 370/466 |
| 2002/0191768 | A1 * | 12/2002 | Stoughton | 379/219 |
| 2003/0093550 | A1 * | 5/2003 | Lebizay et al. | 709/236 |
| 2003/0145108 | A1 * | 7/2003 | Joseph et al. | 709/239 |
| 2003/0169860 | A1 * | 9/2003 | Chou | 379/88.17 |
| 2004/0019700 | A1 * | 1/2004 | Ilan et al. | 709/249 |
| 2004/0034723 | A1 * | 2/2004 | Giroti | 710/8 |
| 2005/0041642 | A1 * | 2/2005 | Robinson | 370/352 |
| 2006/0007871 | A1 * | 1/2006 | Welin | 370/252 |
| 2006/0165066 | A1 * | 7/2006 | Campbell et al. | 370/352 |

(Continued)

*Primary Examiner* — Gerald Gauthier

(74) *Attorney, Agent, or Firm* — Troy A. Van Aacken; Robert J. Starr

(57) ABSTRACT

A microprocessor and a DSP are coupled with a cable modem and an IAD framer to terminate a DS1 link at a media terminal device. The processor performs call control operations and the DSP performs signal processing, such that call processing occurs at the device. The framer extracts or inserts call control information from robbed-bit signaling bits.

Data streams from the DS1 link are formatted/packetized according to a protocol used by a VoIP network. VoIP is used to transmit the packetized call from the cable modem portion to a CMTS over a broadband network. QoS attributes are implemented on the derived data streams as would be done for calls generated by a standard PacketCable EMTA.

17 Claims, 4 Drawing Sheets

U.S. PATENT DOCUMENTS

2008/0095147 A1* 4/2008 Jackson et al. ............... 370/356
2009/0046593 A1* 2/2009 Ptasinski et al. ............. 370/252
2009/0257565 A1* 10/2009 Nelson et al. .................. 379/68
2009/0271512 A1* 10/2009 Jorgensen .................... 709/224

* cited by examiner

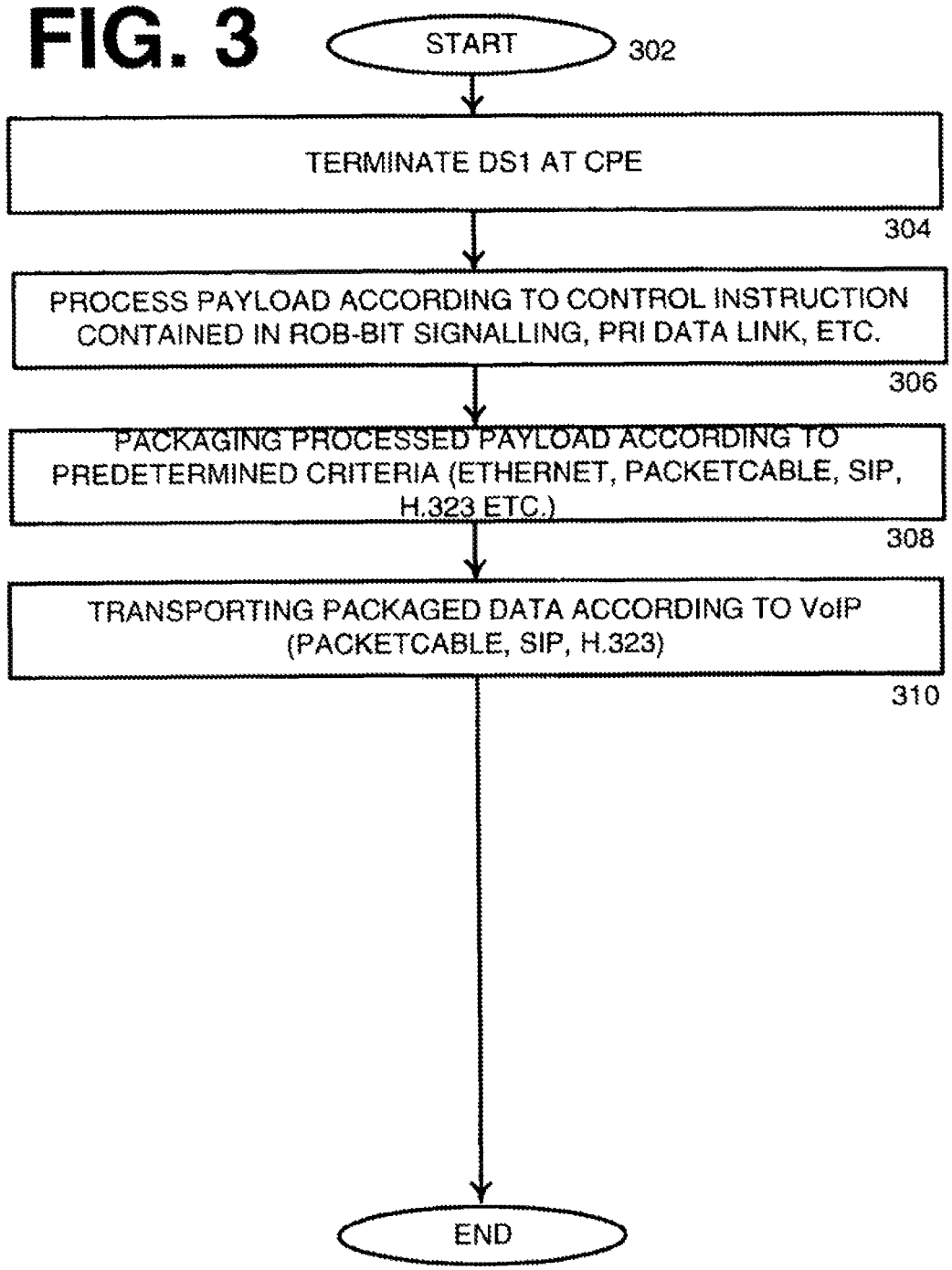

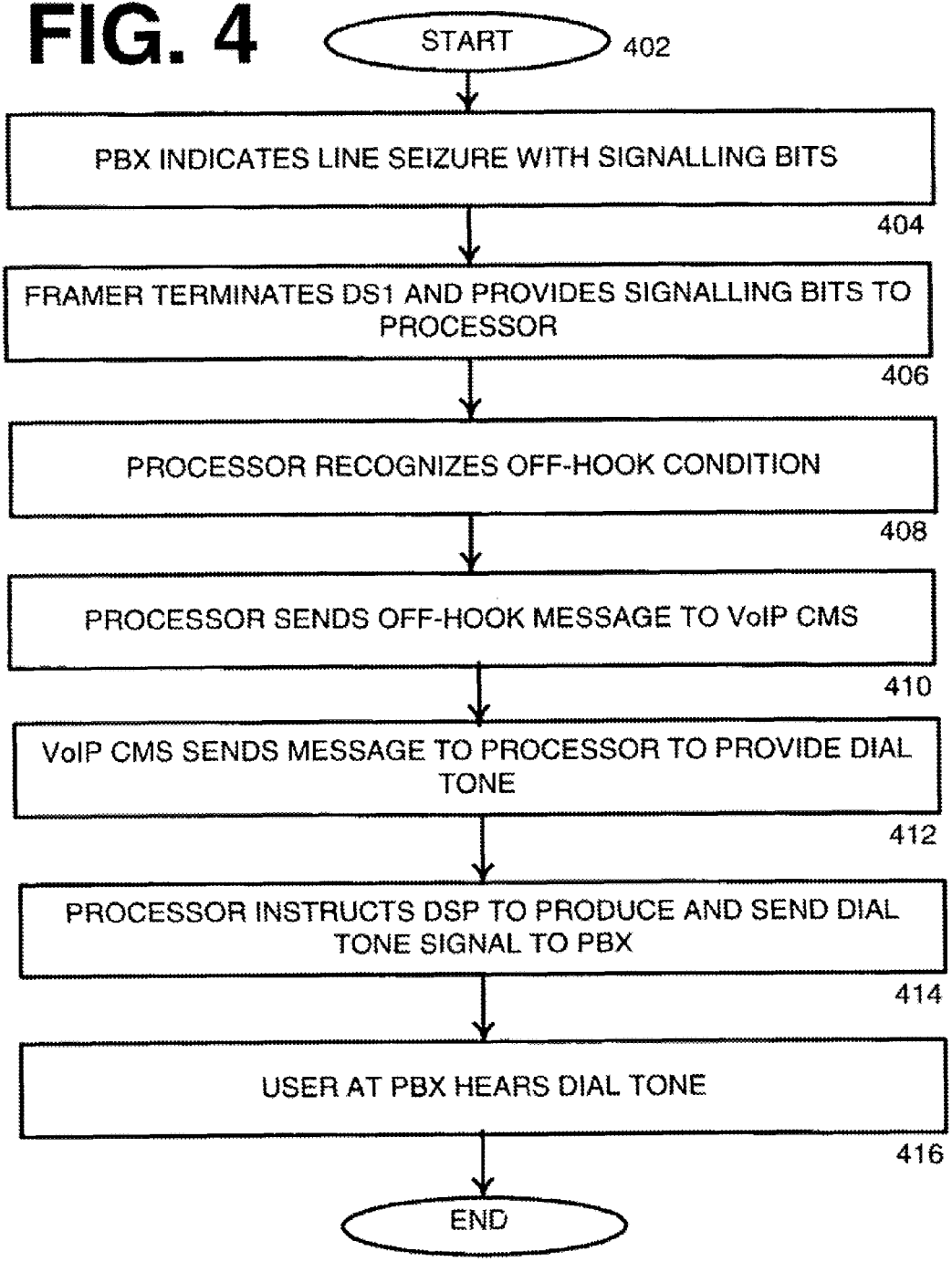

METHOD AND SYSTEM FOR PROCESSING VOICE TRAFFIC FROM A MULTI-CHANNEL LINK INTO A VOIP NETWORK OVER A BROADBAND NETWORK

CROSS REFERENCE TO RELATED APPLICATION

This application claims priority under 35 U.S.C. 119(e) to the filing date of Ansley, U.S. provisional patent application No. 60/498,787 entitled "DS1 Media Terminal Adaptor", which was filed Aug. 29, 2003, and is incorporated herein by reference in its entirety.

FIELD OF THE INVENTION

The present invention relates generally to broadband communication, and more particularly to a method for processing and providing voice traffic from a multi-channel link over an IP network.

BACKGROUND

Community antenna television ("CATV") networks have been used for more then four decades to deliver television programming to a large number of subscribers. Increasingly, CATV networks are used by providers to provide data services to subscribers. For example, cable modems used in a broadband cable modem termination system ("CMTS") are capable of transmitting and receiving Internet data using the Data Over Cable Service Interface Specification ("DOCSIS") protocol. DOCSIS provides a standard that allows network devices made by different vendors to communication with one another.

Similar to DOCSIS, which is administered by Cable Television Laboratories, Inc. (CableLabs®), "PacketCable™ is a CableLabs-led initiative aimed at developing interoperable interface specifications for delivering advanced, real-time multimedia services over two-way cable plant. Built on top of the industry's highly successful cable modem infrastructure, PacketCable networks will use Internet protocol (IP) technology to enable a wide range of multimedia services, such as IP telephony, multimedia conferencing, interactive gaming, and general multimedia applications." See www.packetcable.com. DOCSIS and PacketCable are protocol standards known in the art and do not require further discussion of the basic functioning thereof. However, it will be appreciated that, although DOCSIS and PacketCable are currently considered industry standards, other protocol standards may become predominant over time. Thus, for purposes of discussion herein, DOCSIS may be generically referred to as a 'data protocol' and PacketCable as a 'multimedia protocol.'

A multimedia protocol can be used in conjunction with the Internet to provide services, such as, for example, a voice call that emulates a plain old telephone service ("POTS") telephone call. Another service common in the pre-existing Telecommunication marketplace is DS1 or E1 multi-channel transport service. Several vendors have developed devices that allow multi-channel TDM services, such as DS1 service or E1 service, to be transported over packet-switched networks, such as the Internet. These devices are known in the art as Integrated Access Devices ("IAD"). As shown in FIG. 1, a public branch exchange ("PBX") 2 is often served by a DS1 link 4, DS1 technology being known in the art. The DS1 4 and PBX 2 arrangement may typically be used to support multiple call circuits to an office building, for example. IAD 6 provides an interface between the DS1 with its TDM formatting and a cable modem 8 with its packet-switched technology. Thus, the 24 channels of DS1 4 are formatted by IAD 6 before being transported by modem 8 to CMTS 10. Link 12 between modem 8 and CMTS 10 represent a coaxial or HFC network, for example.

After data contained in the formatted 24 channels has been transported across network 14, which is preferably the Internet or a similar packet-switched network, IAD 16 removes the formatting performed at IAD 6. The 24 channel data streams are then provided to a conventional telephony central office, which routes calls that originated at PBX 2 to a POTS network. Thus, conventional POTS telephony calls placed (or received) from/at PBX 2 are packaged and formatted at IAD 6 before being transported across network 14 before being unformatted/unpackaged at IAD 16. This process is typically referred to in the art as 'transport' because the continuous TDM digital data stream bearing the call traffic between central office 18 and PBX 2 is essentially packed into IP packets at one end and sent to the other end, where the continuous digital data stream is essentially 'unpacked' from the packetized stream and reformed into the original continuous data stream that existed before being converted.

While transport of the 24 DS1 channels provides a means for an operator to provide traditional telecommunication services over a packetized cable network, thus providing competition to the traditional telephone companies, implementation of the system in FIG. 1 can result in inefficient use of cable network bandwidth. For example, since transport of signals provides at the end point the data stream that was injected at the starting point, a caller's audio silence still results in bandwidth being allocated to the call's channel. Even though there is no information being transmitted or received, and thus no bandwidth needed to carry useful information, the same amount of bandwidth between IAD 6 and IAD 16 is reserved as is used when the DS1 channel is carrying dense audio information. This is bandwidth that is not available for allocation to other users over cable network 12 and packet-switched network 14. Furthermore, IADs 6 and 16 only package the voice call information into a format for transporting between modem 8 and CMTS and across the packet-switched network 14 to the other IAD. Accordingly, call processing features are not performed by IADs, and must be performed by legacy POTS network switches. Alternatively, the operator must purchase additional equipment that will translate signals at a PBX DS1 into VoIP signals.

Thus, there is a need in the art for a method and system for using a cable data network and the internet to support multi-channel telecommunications services, as well as other multimedia signals, that minimize bandwidth waste and minimize the cost to provide these services using industry preferred networking and VoIP technologies.

SUMMARY

A DS1 link is terminated at a customer premise equipment media terminal adaptor ("CPEMTA") device. The CPEMTA includes a DS1 framer and associated processing circuitry (essentially an IAD), a cable modem and a digital signal processor. The framer extracts and inserts robbed-bit signaling (or data links in ISDN PRI or E1 CAS signal structures, both known in the art) that are provided to associated processing circuitry to extract call control information. For example, a particular robbed-bit pattern can indicate that minimal bandwidth is to be used, as that particular channel of the multi-channel data link is idle. This information is used to drive an interface into the operator's VoIP network. The data channels from the multi-channel data link are then formatted according to the protocol used by the VoIP network, such as, for example, PacketCable, SIP, or H.323, all known in the art. Thus, from the CPEMTA on in the network, the traditional circuit-switched call has been converted into a VoIP call. PacketCable, SIP, H.323, or other voice over Internet protocol ("VoIP") for example, may be used to transmit the packetized call from the cable modem portion to a CMTS over a broadband network. By integrating the multichannel conversion with a CM, quality of service QoS attributes can be implemented on the derived data streams, just as they would be done for calls generated by a standard PacketCable EMTA.

While the various elements of this design are now sometimes present within a network, they are distributed in such a way as to prevent this application from being implemented. The framer in an IAD cannot provide the level of voice processing required by VoIP; a DSP is necessary. The DSP banks present in Gateway devices can perform the voice processing described, but they are located too far back in the network for any bandwidth conservation advantages. They are also typically sized to handle 28 or more DS1 data streams, which would not be efficient at the HFC access edge of the network.

BRIEF DESCRIPTION OF THE DRAWINGS

FIG. 3 illustrates a method for providing telephony and other multi-media services over a packetized network using a VoIP protocol.

FIG. 4 illustrates a method for initiating a call from a PBX in which a connected multi-channel link is terminated at a media terminal adaptor.

DETAILED DESCRIPTION

As a preliminary matter, it will be readily understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. This disclosure is not intended nor is to be construed to limit the present invention or otherwise to exclude other embodiments, adaptations, variations, modifications and equivalent arrangements, the present invention being limited only by the claims appended hereto and the equivalents thereof.

Figure 2:
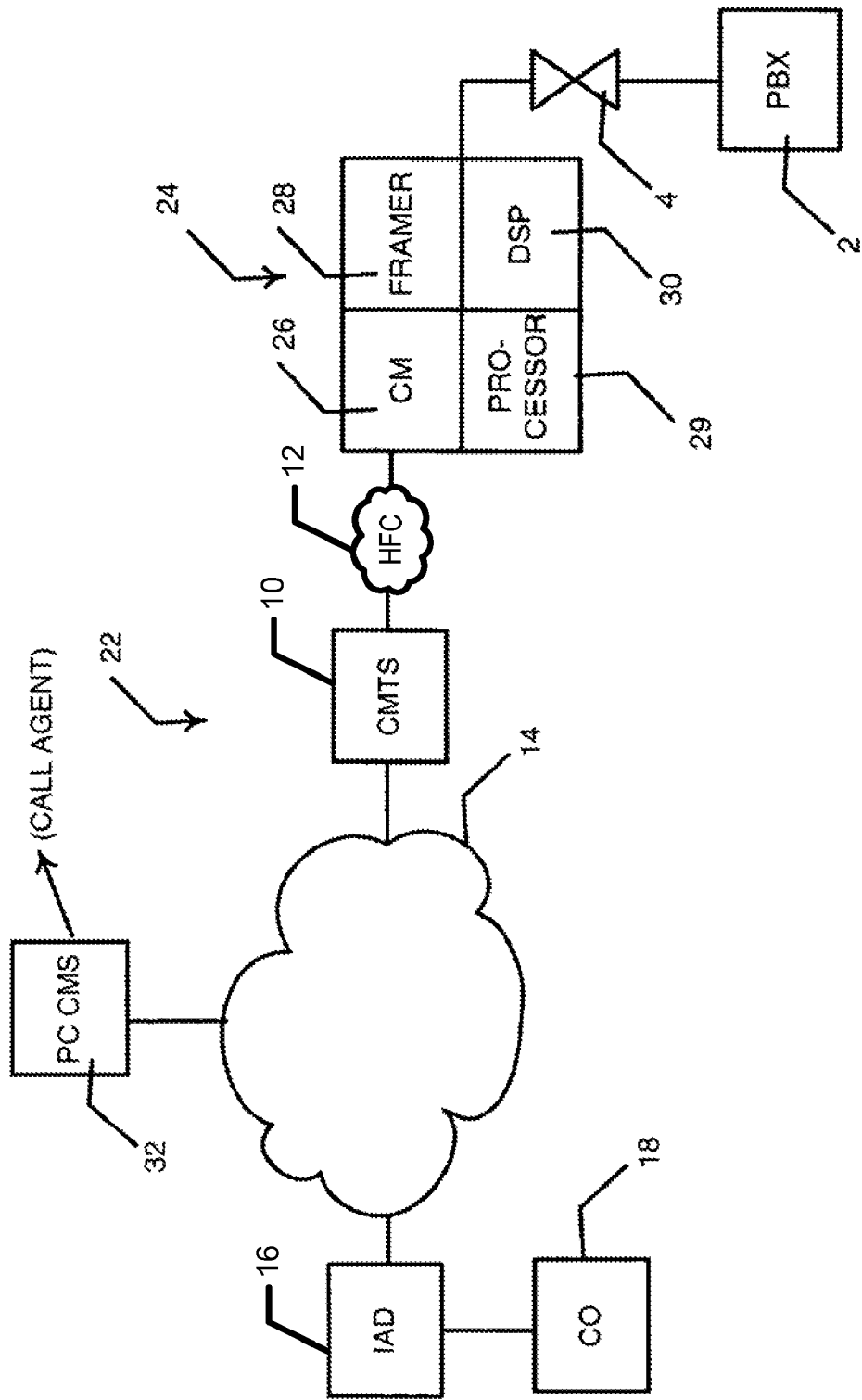
FIG. 2 illustrates a system for providing telephony and other multi-media services over a packetized network using a VoIP protocol.

Turning now to the figures, FIG. 2 illustrates a system 22 for providing voice and other multimedia services over a cable network 12 and IP network 14. Voice calls placed or received at phones served by PBX 2 are connected by DS1 link 4. Customer premise equipment ("CPE") media terminal adaptor ("CPEMTA") 24 processes the multi-channel time division multiplexing ("TDM") data link and processes the TDM voice data with pulse code modulation ("PCM") encoding for use with a VoIP system. The processes performed on the TDM data may include, but are not limited to, echo cancellation, codec compression and decompression, etc, the processed data being converted into VoIP packets that are packaged for transmission over network 12. The reverse processes are also performed on packets received, including unpackaging packetized VoIP information when received from network 12.

Call processing information is also translated between the two domains—TDM and VoIP—by CPEMTA 24. CPEMTA 24 includes a cable modem portion 26, a processor portion 29, a Digital Signal Processor ("DSP") portion 30, and a framer portion 28. Framer portion 28 handles the bi-directional interface with the DS1 link 4. The processor portion 29 processes call control associated with the voice calls (or other multi media signals). Call control, as known in the art, typically includes the sending of messages to establish, maintain or release a call connection. Processor 29 also controls the configuration of the unit in response to user direction. This configuration includes aspects of the CPEMTA's 24 operation, for example, enabling echo cancellation, setting VoIP packet length, configuring a codec in the DSP, etc. as known in the art. For example, the user direction may be from interaction with a command line interface, or from SNMP data delivered through the network from a remote operational support system. Other methods of system configuration are known in the art and are equally applicable.

DSP 30 is used to facilitate voice data processing, such as, for example, echo cancellation, voice compression (to conserve cable bandwidth), voice-activity detection, jitter removal, clock synchronization and voice packetization. Multi-media signals may be processed according to call control instruction information, preferably network-based call signaling ("NCS"), which is known in the art, that can take advantage of robbed-bit signaling from a DS1 link, or a PRI or CAS data link, when PRI or CAS are used instead of robbed bit signaling. After processing, call signals are formatted according to predetermined VoIP packaging rules, preferably Ethernet. Ethernet, robbed-bit signaling and data link signaling are known in the art.

As an example, CPEMTA device 24 may translate robbed-bit signaling into PacketCable compliant NCS signaling messages, thereby making endpoints at PBX 2 and CO 18 appear as conventional POTS lines to call management server 32. Thus voice trunk channels emanating from PBX 2, for example, can be translated into PacketCable data for control by CMS 32. In addition, additional features can be controlled by private Management Information Base variables ("MIB"), as known in the art.

By allocating IP bandwidth as required by call processing status, IP network bandwidth can be used more efficiently over networks 12 and 14. For example, if only three calls are active on a DS1 trunk, only three calls are routed by the CPEMTA through network 12 and 14, whereas with conventional equipment, bandwidth is always reserved for and occupied by all the 24 channels that compose the DS1.

Furthermore, even finer levels of bandwidth conservation are possible as one can now use VoIP techniques that have been developed for bandwidth conservation such as Voice Activity detection. For example, when a party to a call served by PBX 2 is silent, there is no useful information being sent to a caller being served by, for example, CO switch 18. However, instead of allocating upstream (with respect to the PBX) bandwidth to the channel carrying the call in an amount that would otherwise be needed if the caller were not silent, the bandwidth used can be reduced. Since there is no voice information that needs to be sent from PBX 2 to the other caller, DSP 30 can recognize this. Based on this recognition, DSP 30 can avoid sending transmitting packets that represent the channel, since the packets are essentially null anyway.

At the beginning of the silence, the processor 29 in response to a trigger from the DSP 30 can generate an Ethernet packet that includes a message conveying that until further notice, silence can be played at the other caller's location. In practice, instead of being completely silent, the silence message could be detected at the end receiving the silence and instruct a noise generator to produce some white noise to imitate noise that would normally be unconsciously perceived a caller/listener. Thus, a caller would not perceive a drastic difference between a normal POTS call, which would include inherent background noise when the other caller (or another caller in a multi-caller conference, for example) is silent, and a VoIP call, during a time when packets are not transmitted due to the other's silence.

In addition to advantageously reducing bandwidth usage in various ways, device 24 supports transcoding between the continuous PCM u-law or A-law bit streams and the various packetized VoIP codecs. Thus, external and/or remotely located processors are not needed to perform these functions. Accordingly, as discussed above, device 24 facilitates more than mere transport of call signals from PBX 2 to other endpoints.

Figure 1:
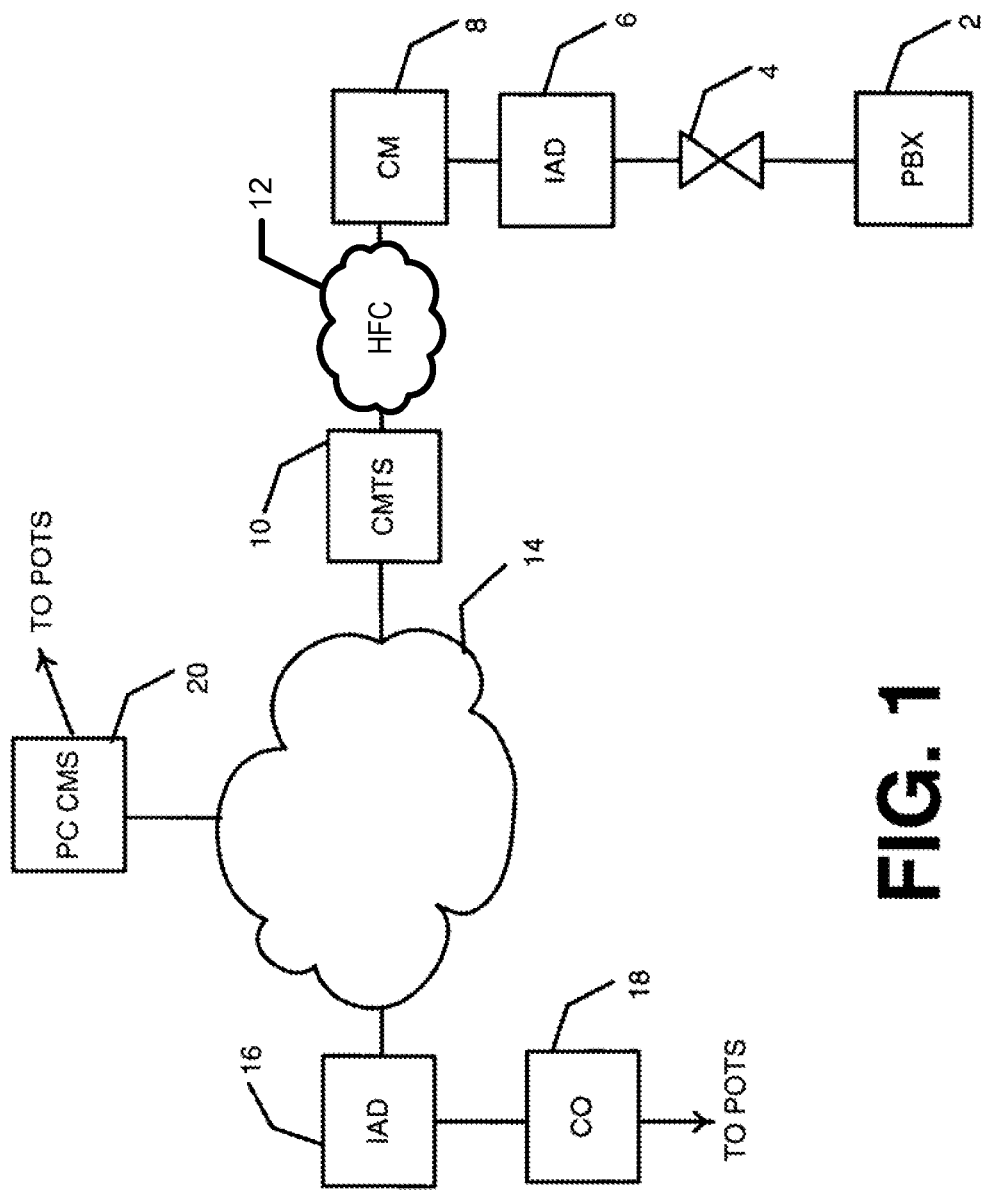
FIG. 1 illustrates a system for transporting multi-channel data streams over a broadband network.

Turning now to FIG. 3, a flow diagram illustrating a method 300 for delivering voice, or other multi-media content, using VoIP protocols over networks 12 and 14 is shown. After the process begins at step 302, DS1 links are terminated at device 24, as shown in FIG. 1. This is a physical step that involves personnel connecting a DS1 link to an appropriate connector for receiving the TDM channels from PBX 2.

At step 306, a DS1's payload is processed according to the call control states of the channels and any applicable VoIP provisioning, as discussed above. The signaling from the DS1 and the call control state of the VoIP connections determine what happens to each channel of the DS1 payload. The processor directs the DSP to process the traffic signals (typically PCM bytes) from a channel with an active call. However, an idle channel is dropped. The DSP performs packetizing-related voice processing and the DSP also acts on the packets coming from the VoIP network and processes them for transmission along the DS1 link to the local end user. These actions may include adjusting volume levels, or enabling packet-loss concealment, for example, in addition to the attributes discussed previously.

At step 308, after call control processing has been performed, the payload is packaged according to a predetermined criteria, or VoIP protocol, such as, PacketCable, SIP or H.323. For instance, PacketCable allows VoIP packets only in 5 ms, 10 ms and 20 ms packetizations. In addition, the data is preferably packaged into Ethernet packets for delivery across an IP network. At step 310, the Ethernet packets are delivered according to the chosen VoIP addressing protocol known in the art. This facilitates applying QoS limits on certain calls, thereby providing another way to manage bandwidth usage as compared to just providing mere transport of calls from endpoint to endpoint. It will be appreciated that the figure illustrates steps taken in the upstream direction, i.e. a caller's speech signals are transmitted from the users location toward the network. However, similar steps may be taken at the receiving endpoint but in a different order than those given in the figure. In addition, a particular application may perform the steps in a different order even for upstream speech signals.

Turning now to FIG. 4, a flow diagram illustrates the steps in a typical scenario 400 where the aspect is used in a PBX environment with a PacketCable CMS. It will be appreciated that the flow diagram may be similar where VoIP protocols other that PacketCable are used, with differences occurring where differences in the way PacketCable and other VoIP protocols are depicted. At step 402, the process starts and when a user picks up a telephone to place a call, the PBX indicates line seizure (the line is no longer open) with signaling bits at step 404. The framer, which terminates the DS1 line, provides signaling bits to the cable modem processor. These signaling bits cause the processor to recognize that an off-hook condition exists with the telephone set at step 408, and the processor sends an off hook message to the VoIP CMS—call agent 32 as shown in FIG. 2—at step 410.

When the CMS has received and logged the off-hook message, it sends a message to the processor at step 412, instructing it to provide a dial tone to the PBX user. The cable modem processor then instructs DSP 30, as shown in FIG. 2, to generate a dial tone and send it to the PBX at step 414. The PBX user hears the dial tone in the telephone receiver 416, and is thus informed that a call can be placed.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents.

I claim:

1. A method for converting circuit-switched voice traffic payload Data. from a multi-channel data link into packet-switched VoIP traffic, comprising:
   terminating the multi-channel data link at a media terminal adapter, wherein the multi-channel data link comprises a plurality of channels and originates from a customer premise equipment private branch exchange;
   receiving call data originating from multiple customer premise equipment telephony devices through the multi-channel data link associated with the customer premise equipment private branch exchange;
   processing call data at the media terminal adapter according to call control instruction information;
   packaging the payload data according to predetermined packaging rules; and
   transmitting the payload data according to a voice over internet protocol.

2. The method of claim 1 wherein the predetermined packaging rules specify that any channel in the multi-channel data link that is deemed not-active is not packaged for transmission.

3. The method of claim 2 wherein a channel that is not seized is deemed not active.

4. The method of claim 2 wherein a channel that is seized but is not carrying useful information because a caller is silent is deemed not-active.

5. The method of claim 1 wherein the call control instruction information includes instruction on how to compress or decompress outgoing or incoming traffic respectively.

6. The method of claim 1 wherein the step of packaging according to predetermined packaging rules includes converting call traffic payload data into Ethernet packets.

7. The method of claim 1 wherein the VoIP protocol is PacketCable™.

8. The method of claim 1 wherein the call control instruction information is contained in robbed-bit signaling bits.

9. The method of claim 1 wherein the voice traffic payload data is processed according to session initiation protocol call control instructions.

10. The method of claim 1 wherein the voice traffic payload data is processed according to H323 call control instructions.

11. A system for terminating a multi-channel data link comprising a plurality of channels and converting information therefrom into packet data at a user device for communication over a network, comprising:
- a hybrid fiber coax interface operable to provide an interface to a hybrid fiber coax network;
- a customer premise equipment interface operable to provide a multi-channel interface to customer premise equipment device;
- a call management module operable to perform call control operations on at least one channel of the plurality of channels and for performing configuration operations on the user device, the call management module being operatively coupled with the hybrid fiber coax interface and the customer premise equipment interface; and
- a data processing module coupled to the call management module operable to perform voice data processing.

12. The system of claim 11 wherein the hybrid fiber coax interface comprises a cable modem.

13. The system of claim 11 wherein the customer premise equipment interface comprises a framer.

14. The system of claim 13 wherein the framer is an integrated access device.

15. The system of claim 11 wherein the call management module comprises is a microprocessor.

16. The system of claim 11 wherein the data processing module comprises a digital signal processor.

17. The system of claim 11 wherein the call control operations include messaging to establish, maintain or release a call connection.

* * * * *